March 18, 1924.
P. F. HARRIS
CYANIDE BOX
Filed Dec. 23, 1922
1,487,236
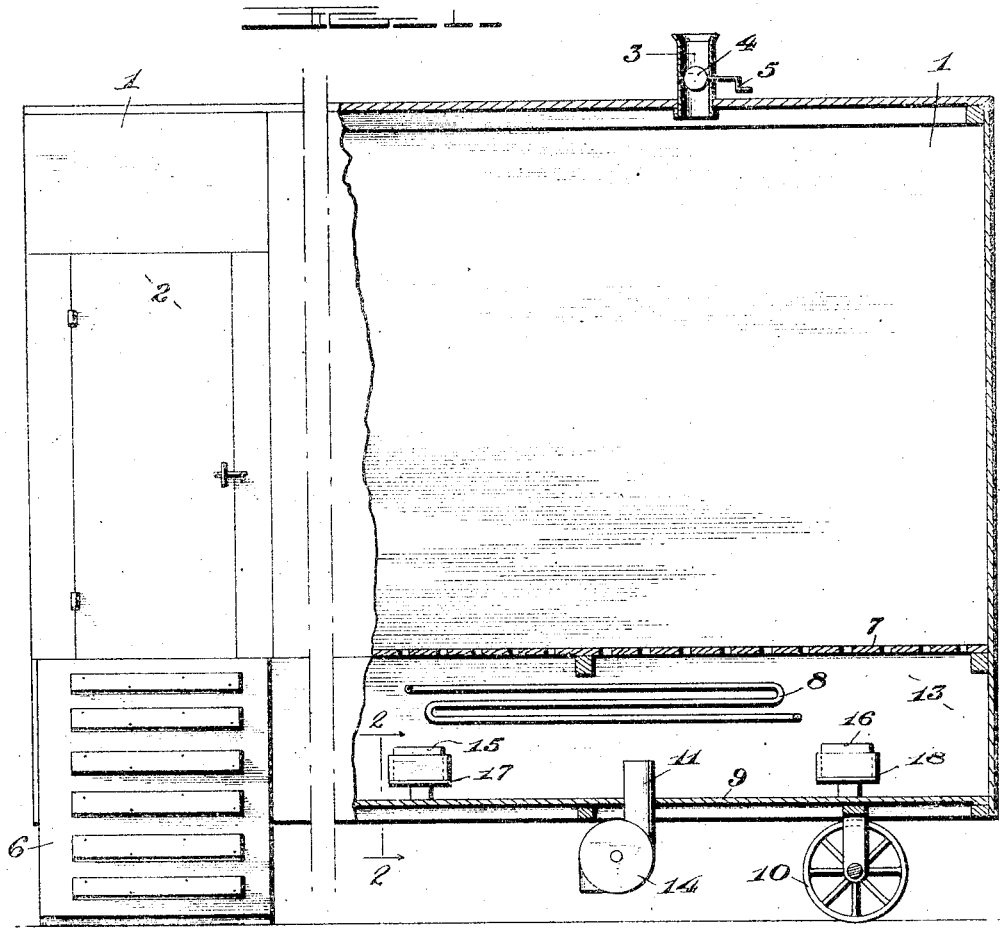
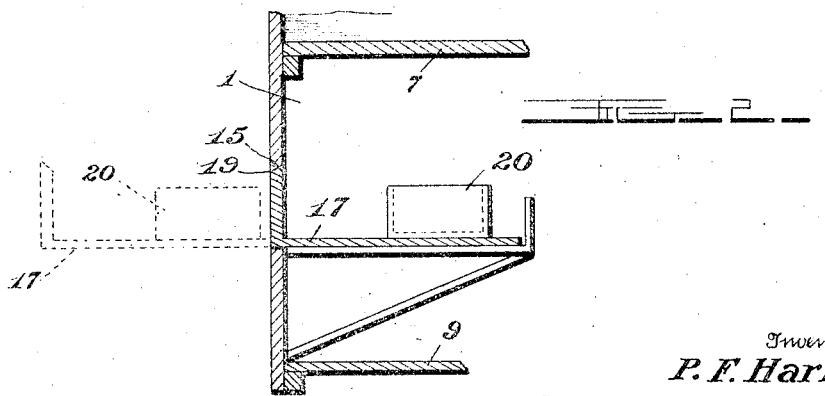
Inventor
P. F. Harris
by J. A. Witherspoon Patented Mar. 18, 1924.

1,487,236

UNITED STATES PATENT OFFICE.

PARLEY FREEMAN HARRIS, OF NASHVILLE, TENNESSEE.

CYANIDE BOX.

Application filed December 23, 1922. Serial No. 608,635.

*To all whom it may concern:*

Be it known that I, PARLEY FREEMAN HARRIS, a citizen of the United States, residing at Nashville, in the county of Davidson and State of Tennessee, have invented certain new and useful Improvements in Cyanide Boxes; and I do hereby declare the following to be a full, clear, and exact description of the invention, such as will enable others skilled in the art to which it appertains to make and use the same.

This invention relates to cyanide boxes, especially adapted for cyaniding various articles such as household furniture, bedding, tobacco, nuts, such as chestnuts, etc., and has for its object to provide an apparatus which will be simple in construction, comparatively inexpensive to manufacture, and more efficient in use than those which have been heretofore proposed.

With these and other objects in view the invention consists in the novel details of construction and combinations of parts more fully hereinafter disclosed and particularly pointed out in the claims.

Referring to the accompanying drawings forming a part of this specification, in which like numerals designate like parts in all the views,—

Figure 1 is a diagrammatic partially sectional view of an enclosure made in accordance with this invention; and Figure 2 is a sectional view of a means of introducing the cyanide solution into the enclosure.

1 indicates any suitable enclosure but preferably made of wood, and of about the dimensions of an ordinary sized room, although of course, this chamber or box may be made of any dimensions desired. 2 indicates a door giving convenient access to the chamber 1, 3 indicates a vent for the exit of the cyanide vapors that may be left in the chamber 1, 4 a valve for the vent 3, which is conveniently operated from the outside, as indicated by the handle 5, 6 any suitable platform or other means leading up to the door 2. 7 indicates a floor for the chamber 1, which may be of a lattice or other perforated construction, 8 a steam coil or any other suitable heating means located below the floor 7 and adapted to raise the chamber 1, to any desired degree of temperature. Ordinarily this temperature would be around about 100° to 120° or 150° F. 9 represents the bottom of the box or chamber 1, and 10 represents any suitable wheels, or other means for moving the said chamber from place to place. Of course, if this chamber is made of substantial dimensions and is to be used in one place only, the wheels could be dispensed with. 11 indicates a pipe for the admission of air under pressure into the compartment 13 below the perforated floor 7, and through the perforations in the floor 7 to the chamber 1, while 14 represents a fan of any suitable construction for sending air under a greater or less pressure through the pipe 11. 15 and 16 represent suitable openings in the side of the box like structure 1, through which slide the members 17 and 18 adapted to make an air tight fit as at 19, with the walls of the chamber. 20 represents suitable containers for the cyanide solution, which are supported by the said members 17 and 18.

All of the parts are made air tight, so that when the cyanide gas is once liberated in the chamber 1, it may be held in it indefinitely.

The operation of this device is as follows:—

When bedding, furniture, or other articles are to be cyanided, or insects associated therewith destroyed, they are introduced into the chamber 1. The said chamber is now closed airtight, and heated up above the outside atmosphere, as by joining the steam coil 8 to any suitable steam supply. This temperature is preferably between 100° F. and 120° F. but may be higher or lower to suit the articles being fumigated. The purpose of thus heating said chamber and articles will be appreciated when it is said:—Hydrocyanic gas HCN is, as is well known, a violent poison, yet, it is not very efficient at temperatures below 50° F. for it then condenses into the liquid form. Its efficiency as a destroyer of insect life and germs I have found to rapidly increase as the temperature is raised, and I have further found that much of its inefficiency in practical fumigation is due to the fact that the cold walls of the fumigated room, ship, etc., serve to so cool the gas in contact therewith that insects and germs located in cracks and crevices are not killed at all, when they would be readily killed if said walls were artificially heated before the fumigation was started. The chamber and contained articles having been thus heated to a suitable temperature, the cyanide solution is made up in the containers 20 outside of the said chamber. A convenient way of producing the cyanide solution is to place a dilute solution of sulphuric acid in the containers 20 and introduce the solid cyanide into the containers while the latter are on the outside of the chamber 1. To this end, the slides 17 and 18 are drawn out of the chamber, and the containers 20 being supported thereon the solid hydrocyanic acid is introduced into said containers and weak solution of sulphuric acid and the slides quickly pushed back into said chamber. This enables one to prepare the cyanide solution on the outside of the chamber, and avoids the necessity of a person entering the chamber in order to place the cyanide solution therein, as has been customary heretofore. The slides 17 and 18 being thus closed, and the cyanide solution resting in the containers 20 on the inside of the chamber 1, the heat that is turned on through the apparatus 8 by any suitable means causes the rapid evolution of HCN gas. All of the parts being airtight, and the door 2 and valve 4 being tightly closed, the cyanide hot vapors will readily penetrate all interstices of the articles being heated. The hot cyanide vapors in said chamber being chemically more active than those at a lower temperature it will be apparent they will be more poisonous to insect life. In other words, by heating the cyanide vapors I am enabled to accomplish three things. In the first place, I more effectually kill any insects and their eggs that are in the articles occupying chamber 1; in the second place I am enabled to use a less quantity of cyanide because the gas is more efficient; and in the third place, I am less liable to damage the articles being treated, because I use a less quantity of cyanide for the same purpose than has been heretofore used. Therefore, it is an important feature of this invention that the fumigation is carried out at a temperature higher than that of the temperature outside. A further important feature of this invention resides in the fact that the cyanide solutions may be prepared outside of the chamber 1, by unskilled persons in the open air where there is little danger involved, and then introduced into said chamber, and the whole made air tight without the necessity of a person entering the said chamber 1. In other words, as the poisonous character of cyanide vapors is well recognized it is obvious that if an unskilled person has to enter a chamber such as 1, after it has been used in order to introduce new charges of cyanide, there is always more or less danger of his stumbling and other accidents happening due to his fear of the poison, and experience shows this to be a real danger.

In this invention, on the other hand, the operator whether skilled or not, need never enter the cyaniding chamber in order to place the cyanide therein, for the solutions in the containers 20 are slid into position through the sliding doors 17 and 18 as above indicated.

After the air tight chamber has been thus heated up and the cyanide vapors evolved, the chamber or box is held tightly closed for a period of time sufficient to kill all of the insect life that may exist therein. This time will vary according to the articles being treated. It may be anywhere from a few hours to several hours or a day. The experienced operator readily judges about how long the articles should be kept under treatment. Another important feature of the invention resides in the fact that during this cyaniding treatment, the vapors being under an appreciable pressure, and at a temperature higher than the normal, it penetrates every crevice and all the interstices of the articles being treated so that it is sure to reach every vestige of insect life. This result is in marked contrast to the ordinary process of fumigating houses, buildings, etc., wherein there is always present more or less leaks through which air may be obtained by the insect life, and therefore, in the treatment of such houses, the results are always far less satisfactory than with my method as has been proved time and again.

That is to say, in my apparatus, there is no chance for a single insect to escape, and a vast experience has shown that articles that are treated in the manner above disclosed are absolutely free of all vermin and other insects after the treatment has been completed.

The allotted time for treatment having expired, the valve 4 is opened, and the fan 14 is set in motion, whereupon a stream of air flows through the entire apparatus and sweeps over the articles treated. This air carries the cyanide vapors out of the top of the apparatus and disperses them into the atmosphere, while at the same time filling the chamber 1 with fresh air from the outside. Experience shows that after this treatment the apparatus being air tight all appreciable traces of the cyanide vapors are carried out of the apparatus, and it is perfectly safe for the operator to enter the same at once to remove the articles that were cyanided.

It is obvious that those skilled in the art may vary the details of construction as well as the procedure of operation above outlined, without departing from the spirit of the invention, and therefore, I do not wish to be limited to the above disclosure except as may be required by the claims.

What I claim is:—

1. In an apparatus for treating articles with hydrocyanic acid gas, the combination of an air tight enclosure; a vent for said enclosure; a valve controlling said vent; a support for said articles in said chamber; an air tight door for entering said enclosure; air tight means for introducing a cyanide solution from the outside into said enclosure; heating means for raising the temperature of said enclosure; and means for blowing fresh air through said enclosure after the cyaniding operation has been completed.

2. In an apparatus for treating articles with hydrocyanic acid gas, the combination of an air tight enclosure; a vent for said enclosure; a valve controlling said vent; a support comprising a perforated floor for said articles in said chamber; an air tight door for entering said enclosure; air tight means comprising a movable door for introducing a cyanide solution from the outside into said enclosure; heating means for raising the temperature of said enclosure above that of the outside atmosphere; and means for blowing fresh air through said enclosure after the cyaniding operation has been completed.

3. In an apparatus for treating articles with hydrocyanic acid gas, the combination of an air tight enclosure; a vent for said enclosure; a valve controlling said vent; a support comprising a perforated floor for said articles in said chamber; an air tight door for entering said enclosure; air tight means comprising a slidable door for introducing a cyanide solution from the outside into said enclosure; means for supporting said slidable door; heating means comprising a steam coil for raising the temperature of said enclosure; and means comprising a fan for blowing fresh air through said enclosure after the cyaniding operation has been completed.

In testimony whereof I affix my signature.

PARLEY FREEMAN HARRIS.